Aug. 19, 1958   M. O. KILPATRICK ET AL   2,848,382
PEBBLE HEATER QUENCH SYSTEM
Filed March 1, 1954
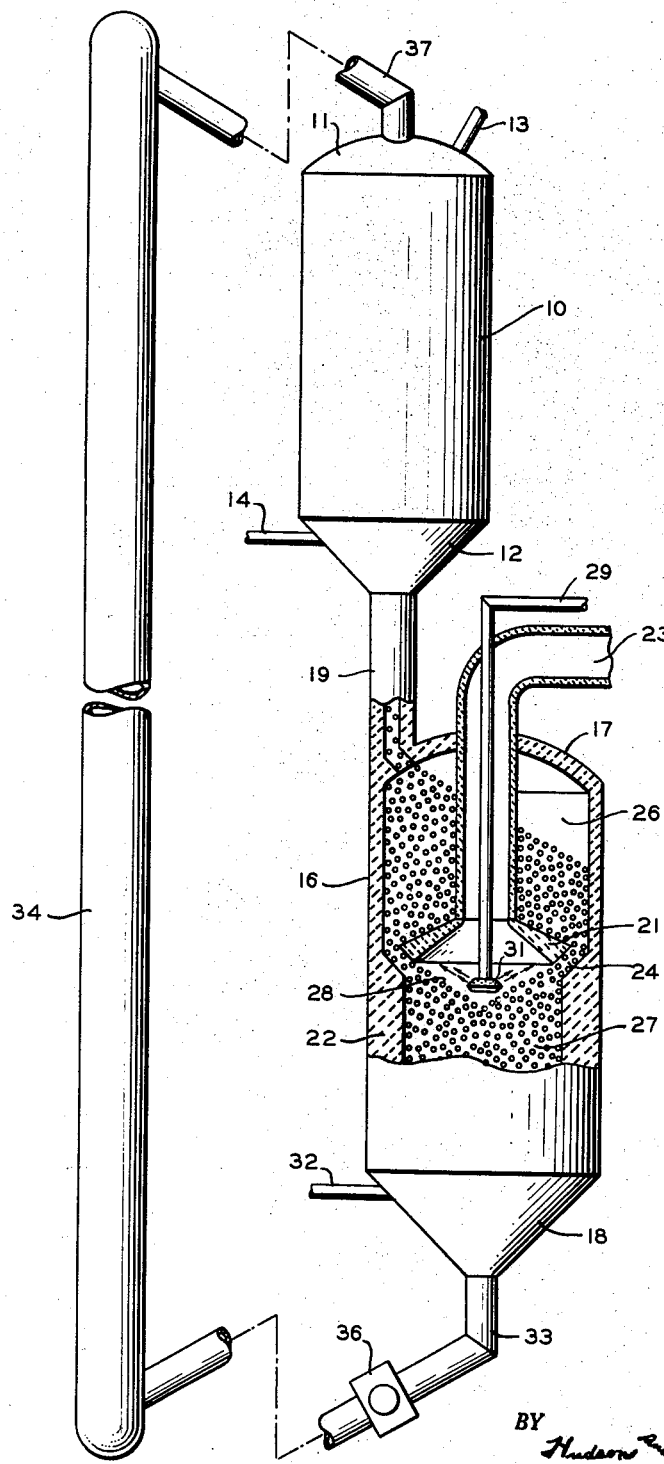
INVENTORS
M. O. KILPATRICK
E. C. AYRES
BY
Hudson and Young
ATTORNEYS

United States Patent Office 2,848,382
Patented Aug. 19, 1958

2,848,382

PEBBLE HEATER QUENCH SYSTEM

Myron O. Kilpatrick and Elwyn Charles Ayres, Bartlesville, Okla., assignors to Phillips Petroleum Company, a corporation of Delaware Application March 1, 1954, Serial No. 413,116

8 Claims. (Cl. 196—55)

This invention relates to the conversion of hydrocarbons. In one of its more specific aspects, it relates to the conversion of hydrocarbons in pebble heater apparatus. In another of its more specific aspects, it relates to the quenching of cracked gases. In still another of its more specific aspects, it relates to a quenching system for use with pebble heater apparatus. In yet another of its more specific aspects, it relates to a method for preventing the deposition of carbonaceous materials in the reactor of pebble heater apparatus.

In carrying out thermal conversion processes in pebble heater apparatus, a gravitating mass of solid heat exchange material heated to a high temperature by passing hot gas therethrough in a first direct heat exchange step is thereafter caused to contact gaseous reactant materials in a second direct heat exchange. Conventional pebble heater apparatus generally comprises a pebble heating chamber and a gas reaction chamber which may be disposed in substantially vertical alignment. The solid heat exchange material is introduced into the upper portion of the pebble heating chamber where the material forms a bed of heat exchange material which flows downwardly through the chamber in direct heat exchange with hot gaseous heat exchange material. In this first heat exchange, the solid heat exchange material is heated to a high temperature and is then passed to the gas reaction chamber in which the hot solid heat exchange material is caused to contact gaseous reactant materials in a second direct heat exchange relation furnishing heat for the treatment or conversion of the gaseous materials. The solid heat exchange material, cooled as a result of the second heat exchange, emerges from the bottom of the reaction chamber and flows downwardly to the lower part of an elevator which raises the material to the upper portion of the pebble heating chamber.

Solid heat exchange material which is conventionally used in pebble heater apparatus is generally called "pebbles." For a more complete description of the pebbles which can be utilized, reference may be had to U. S. Patent No. 2,536,436.

Thermal conversion processes carried out in pebble heater apparatus are conducted at relatively high temperatures. In general, pebbles in the pebble heating chamber are heated to a temperature in the approximate range of 1200° F. to 3200° F. depending upon the particular process. Ordinarily, pebble inlet temperatures in the reaction chamber are about 100° F. to 500° F. below the average combustion gas temperature within the pebble heating chamber. For example, in processes for the production of ethylene from light hydrocarbons, such as ethane or propane, the pebble temperature in the gas reaction chamber is usually in the range of 1200° F. to 1800° F. In the production of acetylene by the pyrolysis of hydrocarbons, temperatures in the range of 1800° F. to 3000° F. are desirable.

In general, it can be stated that the reaction times for the various conversion processes vary inversely with the reaction temperatures, i. e., the higher the reaction temperature the shorter the reaction time. In the case of the production of acetylene, which is conducted at comparatively high reaction temperatures, it is important that the reaction be allowed to proceed for only a very short period of time, for otherwise polymerization and decomposition of the product will result with a correspondingly low rate of product yield. In conventional pebble heater apparatus, it is customary to pass the cracked gases from the reaction chamber through an effluent outlet conduit into a quench chamber for cooling of the gases. Such an arrangement of apparatus is especially unsuitable for use in the manufacture of acetylene, for it does not provide for the rapid cooling so critical in the formation of acetylene. Furthermore, in any particular process it is advantageous to quench the conversion products as soon as possible so as to prevent polymerization of any polymerizable materials contained therein. With conventional apparatus in which polymerization is allowed to occur because of the delay in quenching, the polymerized materials condense on contacting the reactor and result in the deposition of carbonaceous materials around the effluent outlet conduit and the reactor dome. The resulting carbon laydown often becomes several inches thick during the operation of the pebble heater apparatus and sometimes completely closes off the gaseous effluent conduit outlet. And further, chunks of carbon may break away from the reactor dome and subsequently lodge in the pebble outlet, thereby obstructing or blocking completely the flow of pebbles through the apparatus. In accordance with the present invention, means are provided for immediately quenching the cracked gases as they leave the pebble bed within the gas reaction chamber, thereby cooling those gases to a temperature at which they are stable. Polymerization and decomposition of the gases are thereby inhibited, and concomitantly the deposition of carbon within the reactor and around the effluent outlet conduit is substantially prevented.

The following objects of the invention will be attained by the various aspects of the invention.

It is an object of this invention to provide improved pebble heater apparatus.

Another object of the invention is to provide an improved quench system for use with pebble heater apparatus.

Still another object of the invention is to provide a method for rapidly quenching the reaction products of a hydrocarbon conversion process so as to prevent polymerization and decomposition thereof.

A further object of the invention is to provide an improved process for preventing the deposition of carbon in the upper portion of the reactor of pebble heater apparatus.

A still further object of the invention is to provide an improved process for the production of unsaturated hydrocarbons.

Other and further objects, advantages and features of the invention will become apparent to those skilled in the art from the accompanying disclosure.

Broadly speaking, the present invention lies in a method for rapidly quenching the reaction products of hydrocarbon conversion processes wherein a heat exchange fluid is introduced directly into the reaction chamber of a pebble heater apparatus in the form of a spray which parallels and is above the surface of the pebble bed formed therein. The cracked gases leaving the pebble bed immediately encounter the vaporized heat exchange fluid and are thereby rapidly cooled to a temperature at which they are stable.

It is believed that the carbon which builds up in the reactor of pebble heater apparatus results from the fact that some polymerization has taken place therein and that the polymerized materials condense on contacting the upper portion of the reactor and form coke. Since acetylene compounds are the most likely to polymerize, the present invention is especially applicable to the manufacture of acetylene, for the more rapid the quenching, the less polymerization occurs with a corresponding increase in the amount of product formed and decrease in carbon lay-down. In the conversion of hydrocarbons regardless of the reaction, however, the unpolymerized unsaturated hydrocarbons are what is wanted rather than polymerized hydrocarbons. Thus, in the production of ethylene, if acetylene is formed, it is desired to recover the acetylene as a valuable by-product rather than to lose it to polymerization. Because of the more rapid quenching of the reaction products which is made possible by the practice of this invention, it is apparent that a higher rate of product yield is made possible while at the same time the deposition of carbon in the reaction chamber is substantially inhibited.

A more complete understanding of the invention may be obtained by reference to the following description and drawing which is a diagrammatic elevation of pebble heater apparatus, partly in section, suitable for practicing the present invention.

Referring particularly to the drawing, the pebble heater apparatus comprises an upright elongated shell 10 closed at its upper and lower ends by closure members 11 and 12, respectively. Gaseous effluent outlet conduit 13 extends from the upper portion of the pebble heating chamber formed within shell 10 while heating material inlet means 14 is provided in the lower portion of that chamber. Upright elongated shell 16 closed at its upper and lower ends by closure members 17 and 18, respectively, is disposed below shell 10. Pebble conduit means such as conduit 19, or a plurality of such conduits, extends between closure member 12 of shell 10 and closure member 17 of shell 16.

A substantially conical baffle member 21 in the form of a load-supporting dome is disposed intermediate the ends of shell 16 and is supported at its periphery by the insulation material 22 lining the walls of the shell. A gaseous effluent outlet conduit 23 extends upwardly from the apex of conical baffle member 21 to the exterior of shell 16. A plurality of pebble conduit means 24 disposed around the lower periphery of conical baffle member 21 communicate pebble soaking chamber 26, formed above conical baffle member 21, with reaction chamber 27, formed below conical baffle member 21. The top surface of the mass of pebbles formed within reaction chamber 27 is substantially in the shape of an inverted cone and is indicated by reference numeral 28. A heat exchange fluid inlet conduit 29 disposed within gaseous effluent outlet conduit 23 extends downwardly into the reaction chamber to a point adjacent the low point of the pebble bed. Spraying means 31, preferably a high pressure drop type nozzle, is attached to the end of conduit 29 adjacent the pebble bed and is adapted to spray a heat exchange fluid parallel to and immediately adjacent surface 28 of the pebble bed. While the heat exchange fluid inlet conduit is illustrated as being disposed within effluent outlet conduit 23, it is not intended to so limit the invention. Accordingly, it is within the scope of the invention to utilize a heat exchange fluid inlet conduit which passes directly into the reaction chamber through the walls of shell 16.

A reactant material inlet conduit 32 is provided in the lower portion of shell 16. Pebble outlet conduit 33 which extends downwardly from closure member 18 of shell 16 is connected to the lower portion of elevator 34. Pebble feeder 36 is provided intermediate the ends of pebble outlet conduit 33 and may be one of the conventional pebble feeders such as a star valve, a gate valve, a rotatable table feeder, or the like. Pebble inlet conduit 37 extends between the upper end of elevator 34 and closure member 11 of shell 10.

In the operation of the apparatus of the drawing, pebbles are introduced into the upper portion of the heating chamber formed within shell 10 and are gravitated therethrough as a contiguous mass of pebbles. A heating material is introduced into the lower portion of the heating chamber through inlet conduit 14. The heating material may be fuel and air, the fuel being burned upon the surface of the pebbles within the heating chamber or below or around the pebble bed. The heating material may also be hot combustion gases resulting from the combustion of a fuel outside the heating chamber. The hot combustion gases which are passed upwardly through the gravitating mass of pebbles within the heating chamber are removed from the chamber through gaseous effluent conduit 13. The gravitating pebbles are heated by direct heat exchange with the hot combustion gases to temperatures generally in the approximate range of 1200° F. to 3200° F., depending upon the particular reaction being carried out with the pebble heater apparatus. The hot pebbles are gravitated through conduit 19 into pebble soaking chamber 26 formed within the upper portion of shell 16. The temperature of the pebbles entering pebble soaking chamber 26 are generally about 100° F. to 500° F. below the average temperature of the combustion gases within the heating chamber.

The pebbles remain momentarily within the pebble soaking chamber 26 and thereafter pass through pebble conduit means 24 as a plurality of streams of pebbles into the reaction chamber 27. By remaining momentarily within pebble soaking chamber 26, any temperature differential which may exist between the pebbles is substantially equalized. The gravitating mass of pebbles within reaction chamber 27 has an upper surface 28 substantially in the shape of an inverted cone. Hydrocarbon reactant materials introduced into the reaction chamber through inlet conduit 32 are caused to pass countercurrently to the gravitating flow of pebbles through the reaction chamber. The reactant materials are raised to conversion temperature by direct heat exchange with the pebbles in that chamber. During the conversion process being carried on in the reaction chamber, a heat exchange fluid is continuously sprayed through spraying means 31 parallel to and adjacent upper surface 28 of the pebble bed. As a heat exchange fluid, it is preferred to utilize water which is broken up into extremely fine particles by the high pressure drop nozzle utilized as the spraying means. It is within the contemplation of the invention, however, to employ other heat exchange fluids such as steam, preferably at a temperature of 400° F. or lower, or a highly refractory hydrocarbon such as an aromatic oil. The conversion products leave the top surface 28 of the pebble bed and immediately contact the heat exchange fluid which has been broken up into fine droplets so as to form a fog immediately above the top surface of the pebble bed. The conversion products are thereby rapidly cooled to a temperature at which they are stable, preferably to a temperature in the approximate range of 500° F. to 1000° F. The cooled conversion products are removed from the reaction chamber through effluent outlet conduit 23 and thereafter passed to quenching means and a purification system, not shown, for further cooling and for removal of tar therefrom. The vaporized heat exchange fluid is also removed from the reaction chamber along with the conversion products. The cooled pebbles flow from the bottom of the reaction chamber through pebble outlet conduit 33 at a rate dependent on the operation of pebble feeder 36. The pebbles enter the lower end of elevator 34 and are raised thereby to pebble inlet conduit 37 through which the pebbles pass into the upper portion of the heating chamber.

By rapidly quenching the conversion products as they leave the pebble bed within the reaction chamber as described above, polymerization and decomposition is substantially inhibited. Accordingly, a higher rate of product yield is made possible while at the same time deposition of carbonaceous material in the reactor is prevented through elimination of the polymerized materials which in conventional pebble heater reactors tend to condense and form coke. While the present invention has been illustrated and described with relation to a particular pebble heater apparatus, it is to be understood that it is not intended to limit the invention to the specific apparatus described. Accordingly, in the light of the instant disclosure, it becomes apparent that other types of pebble heater reactors may be provided with spraying means suitable for furnishing a fine spray of heat exchange fluid parallel to and immediately adjacent the top surface of the pebble beds formed therein.

As will be evident to those skilled in the art, various modifications of this invention may be made or followed in the light of the foregoing disclosure and discussion without departing from the spirit or scope of the disclosure.

We claim:

1. An improved reactor for pebble heater apparatus which comprises, in combination, a closed upright elongated shell; pebble inlet means in the upper end of said shell; effluent outlet conduit means in the upper portion of said shell; pebble outlet means in the lower portion of said shell; a mass of pebbles within said shell; and means for spraying a heat exchange fluid parallel to and immediately above the top surface of said mass of pebbles.

2. An improved reactor for pebble heater apparatus which comprises, in combination, a closed upright elongated shell; pebble inlet means in the upper end of said shell; effluent outlet conduit means in the upper portion of said shell; pebble outlet means in the lower portion of said shell; fluid inlet means in the lower portion of said shell; a mass of pebbles within said shell; a heat exchange fluid inlet conduit extending into said shell to a point adjacent the top surface of said mass of pebbles; and spraying means attached to the end of said heat exchange fluid inlet conduit adjacent the top surface of said mass of pebbles, said spraying means being adapted to spray heat exchange fluid parallel to said top surface.

3. An improved reactor for pebble heater apparatus which comprises, in combination, a closed upright elongated shell; pebble inlet means in the upper end of said shell; pebble outlet means in the lower portion of said shell; fluid inlet means in the lower portion of said shell; a substantially conical baffle member disposed in said shell intermediate its ends, said member being supported at its periphery by the walls of said shell; a plurality of pebble conduit means spaced around the periphery of said conical baffle member and communicating a pebble soaking chamber formed within said shell above said baffle member with a reaction chamber formed within said shell below said baffle member; a first bed of pebbles within said soaking chamber; a second bed of pebbles within said reaction chamber, the upper surface of said second bed being substantially in the shape of an inverted cone; an effluent outlet conduit extending from the apex of said conical baffle member to the exterior of said shell; a heat exchange fluid inlet conduit extending into said reaction chamber to a point adjacent the low point in said second pebble bed; and spraying means attached to the end of said heat exchange fluid inlet conduit adjacent said second pebble bed, said spraying means being adapted to spray heat exchange fluid parallel to the surface of said second pebble bed.

4. An improved reactor for pebble heater apparatus which comprises, in combination, a closed upright elongated shell; pebble inlet means in the upper end of said shell; pebble outlet means in the lower portion of said shell; fluid inlet means in the lower portion of said shell; a substantially conical baffle member disposed in said shell intermediate its ends, said member being supported at its periphery by the walls of said shell; a plurality of pebble conduit means spaced around the periphery of said conical baffle member and communicating a pebble soaking chamber formed within said shell above said baffle member with a reaction chamber formed within said shell below said baffle member; a first bed of pebbles within said soaking chamber; a second bed of pebbles within said reaction chamber, the upper surface of said second bed being substantially in the shape of an inverted cone; an effluent outlet conduit extending from the apex of said conical baffle member to the exterior of said shell; a heat exchange fluid inlet conduit positioned within said effluent outlet conduit and extending downwardly through said conical baffle member into said reaction chamber to a point adjacent the low point in said second pebble bed; and spraying means attached to the end of said heat exchange fluid inlet conduit adjacent said second pebble bed, said spraying means being adapted to spray heat exchange fluid parallel to the surface of said second pebble bed.

5. An improved process for the conversion of hydrocarbons which comprises heating pebbles in a first chamber to a temperature between about 1200° F. and 3200° F.; gravitating hot pebbles from said first chamber into and through a second chamber, thereby forming a contiguous mass of pebbles within said second chamber; contacting said hot pebbles with hydrocarbon reactant materials in direct heat exchange in said second chamber; raising said hydrocarbon reactant materials to conversion temperature by said direct heat exchange; spraying a heat exchange fluid parallel to and immediately above the top surface of said mass of pebbles within said second chamber; passing the conversion products resulting from said direct heat exchange from the top surface of said pebble mass into said heat exchange fluid, thereby rapidly cooling said conversion products to a temperature at which they are stable; removing said conversion products from the upper portion of said second chamber; removing heat exchange fluid from the upper portion of said second chamber with said conversion products; removing said pebbles from the lower portion of said second chamber; and returning said pebbles to said first chamber.

6. The process of claim 5 in which water is used as the heat exchange fluid and said conversion products are cooled to a temperature between about 500° F. and 1000° F.

7. The process of claim 5 in which steam is used as the heat exchange fluid and said conversion products are cooled to a temperature between about 500° F. and 1000° F.

8. An improved process for the conversion of hydrocarbons which comprises heating pebbles in a first chamber to a temperature between about 1200° F. and 3200° F.; gravitating hot pebbles from said first chamber into a pebble soaking zone formed within the upper portion of a second chamber; gravitating said hot pebbles substantially at the same temperature from said pebble soaking zone as a plurality of peripheral streams into a reaction zone formed within the lower portion of said second chamber, thereby forming therein a contiguous mass of pebbles having an upper surface substantially in the shape of an inverted cone; contacting said hot pebbles with hydrocarbon reactant materials in direct heat exchange in said reaction zone; raising said hydrocarbon reactant materials to conversion temperature by said direct heat exchange; spraying a heat exchange fluid parallel to and immediately above the upper surface of said mass of pebbles within said reaction chamber; passing the conversion products resulting from said direct heat exchange from the upper surface of said mass of pebbles into said heat exchange fluid, thereby rapidly cooling said conversion products to a temperature at which they are stable; removing said conversion products from the upper portion of said reaction zone; removing heat exchange fluid from the upper portion of said reaction zone with said conversion products; removing pebbles from the lower portion of said reaction zone; and returning said pebbles to said first chamber.

References Cited in the file of this patent

UNITED STATES PATENTS

| | | |
|---|---|---|
| 2,500,870 | Robinson | Mar. 14, 1950 |
| 2,623,842 | Robinson | Dec. 30, 1952 |
| 2,673,791 | McIntire | Mar. 30, 1954 |
| 2,729,548 | Forkel | Jan. 3, 1956 |